2 Sheets—Sheet 1.

T. BRENNAN, J. TAYLOR & J. T. LYNAM.
GRAIN-DRILL

No. 193,075      Patented July 17, 1877.

Attest
H. D. Pennie
C. F. Barrett

Inventors:
Thos. Brennan
Jas. Taylor
Jno. T. Lynam
By Wm H Grincket
Attorney

2 Sheets—Sheet 2.
T. BRENNAN, J. TAYLOR & J. T. LYNAM.
GRAIN-DRILL.
No. 193,075. Patented July 17, 1877.
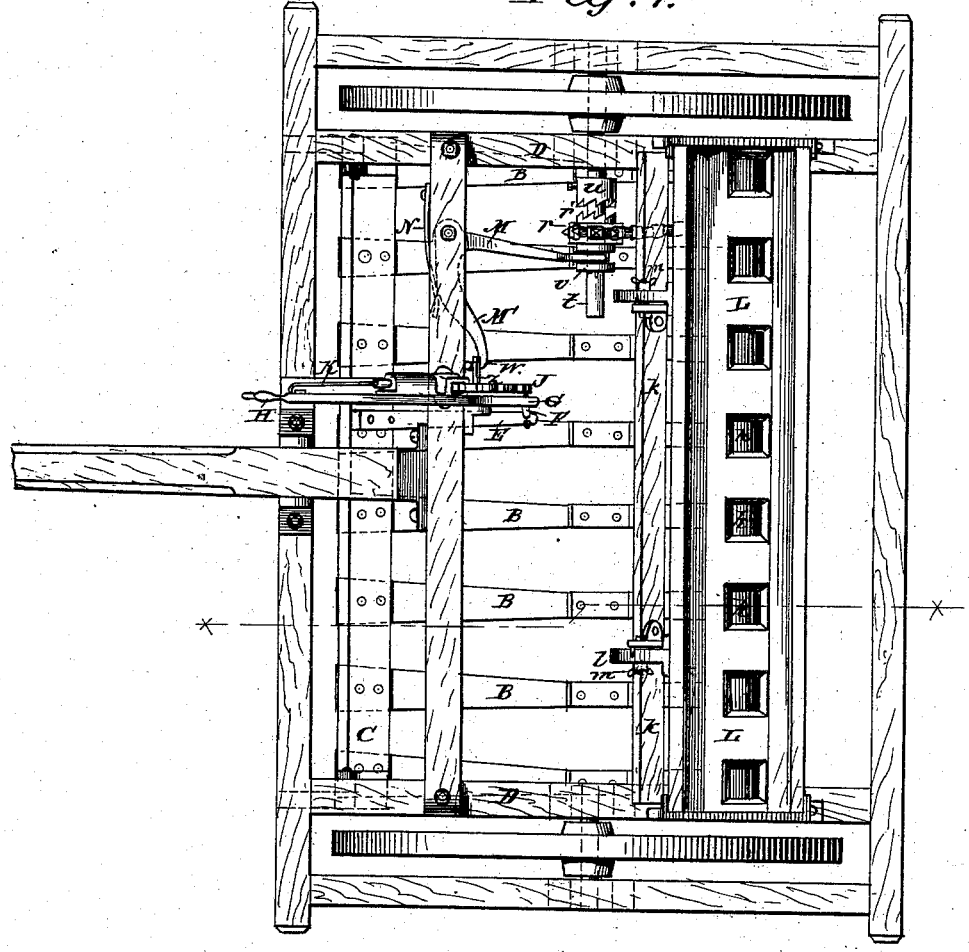
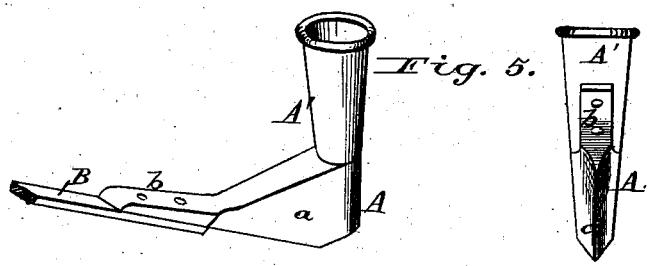
Attest:
H. L. Perrine
C. F. Barrett
Inventors.
Thos. Brennan
Jas. Taylor
Jno. T. Lynam
By Wm. H. Finckel
Attorney.

UNITED STATES PATENT OFFICE.

THOMAS BRENNAN AND JAMES TAYLOR, OF LOUISVILLE, AND JOHN T. LYNAM, OF JEFFERSON COUNTY, KENTUCKY.

IMPROVEMENT IN GRAIN-DRILLS.

Specification forming part of Letters Patent No. 193,075, dated July 17, 1877; application filed January 29, 1877.

*To all whom it may concern:*

Be it known that we, THOMAS BRENNAN and JAMES TAYLOR, of Louisville, and JOHN T. LYNAM, of Jefferson county, in the State of Kentucky, have invented a certain new and useful Improvement in Grain-Drills; and we do hereby declare that the following is a full, clear, and exact description thereof, which will enable others skilled in the art to make and use the same, reference being had to the accompanying drawings, forming part of this specification, in which—

Figure 1:
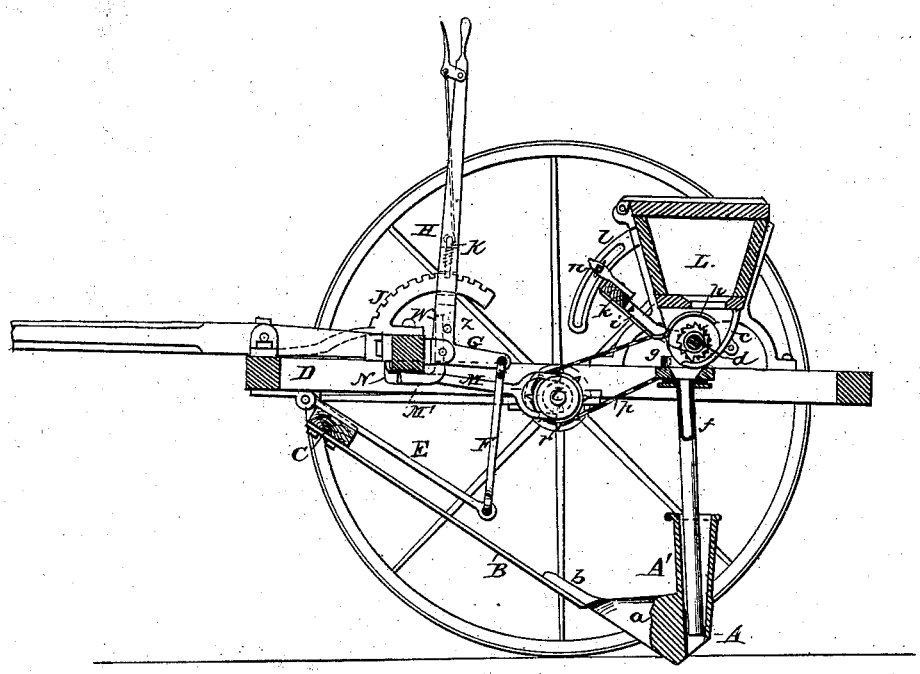
Figure 2:
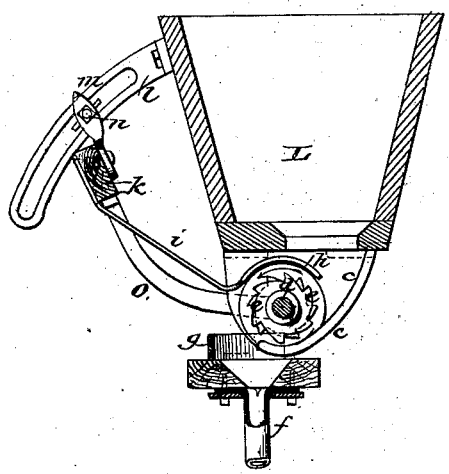
Figure 3:
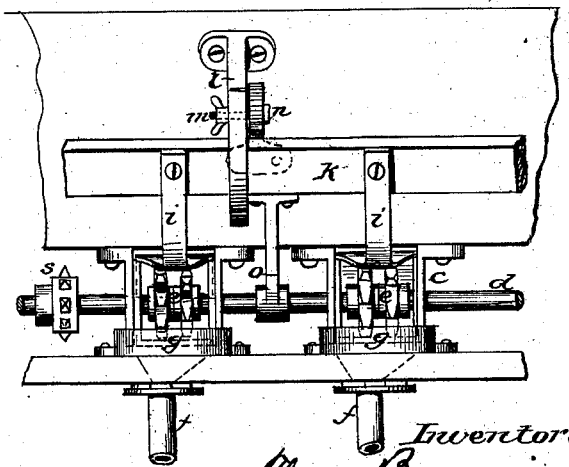

Figure 1 is a longitudinal vertical section on line $x\ x$ of Fig. 4. Fig. 2 is a cross-section of the hopper, with its feed-wheels and valves. Fig. 3 is a front elevation of the hopper, &c. Fig. 4 is a top-plan view of the drill. Fig. 5 shows, in perspective and front views, the furrow-openers.

Our invention consists in peculiarly-constructed furrow-openers, provided with straight flat springs, and having one adjustment incident to the springs and another independent of the springs, the former for the purpose of avoiding rocks, inequalities, &c., in the ground, and the latter for raising all of the openers out of the ground in going to or leaving a field, the construction being substantially as hereinafter specified.

The letters A in the drawings designate furrow-openers, whose lower ends are V-shaped in front and side view, and which are constructed with pioneer colters $a$, with sharpened edges. (See front view, Fig. 5.) The furrow-openers are further provided with tubular extensions A', and their colters terminate in flat tongues $b$. To these tongues $b$ straight flat steel springs B are secured at one end, their other ends being attached to a bar, C. This bar C is hinged to the frame D of the drill, so as to permit the raising and lowering of all of the furrow-openers simultaneously in going to or leaving a field, or while therein, if necessary, and this operation is performed by the user through a hand-lever, H, fulcrumed to the frame, which lever is connected with the bar C by the link F, which extends from an arm, G, of the lever, to a rod, bar, or plate, E, projecting from the said bar C. The hand-lever H is retained in any given position by means of its dog K, engaging a toothed rack, J.

L is the hopper, having secured beneath it a number of seed feed-boxes, $c$. These boxes are preferably cast in two pieces and afterward bolted together, as indicated in Fig. 1, and they are provided with bearings for a shaft, $d$. Upon this shaft $d$, and within the seed feed-boxes, are placed toothed or cellular wheels $e$, the cells opening forward. There are, preferably, two of such wheels in each box, their cells or teeth being alternate. (See Figs. 2 and 3.) Beneath the boxes $c$ are arranged the cups $g$ of the seed-tubes $f$, the said seed-tubes extending into the tubular portions A' of the furrow-openers.

The wheels $e$ revolve in the direction of the arrow, Fig. 2, and hence the feed is overshot. The quantity fed from the hopper is regulated by valves $h$, made to cover the tops of the wheels, and adjustable relatively thereto. These valves are connected, by stems $i$ attached thereto, to a bar, $k$, and this bar is supported by hangers $o$, turning on the shaft $d$, or otherwise, and is adjustable on slotted arms $l$, extending from the hopper, being fixed in any given position by set-screws $m$ entering arms $n$ on the said bar $k$.

It will be understood that the adjusting of the bar $k$ on the arms $l$ so moves the valves as to more or less cover or uncover the wheels $e$, and thereby diminish or increase the feed.

Motion is imparted to the shaft through a chain or belt, $p$, extending from a pulley, $s$, thereon, to a pulley, $r$, on the shaft $t$ of a driving-wheel. This pulley $r$ is keyed to the shaft or axle $t$, so as to slide horizontally thereon, and its vertical face $r'$ is ratchet-formed. This portion $r'$ constitutes the male member of a clutch, the female member $u$ being fast on the axle $t$. $v$ is a collar on the pulley $r$, and M a lever, whose forked end straddles said collar. This lever is fulcrumed to the frame, and is constructed with an arm, M', which, by means of a vertical finger, $w$, thereon, engages with a pin, $z$, on the lever H, so that, as the said lever is depressed, (moved forward,) the pin $z$ so acts upon the finger of arm M' as to cause the forked lever M to draw the pulley $r$ inwardly and disconnect the clutch, consequently causing the cessation of rotation of the pulley $r$ and the feed-shaft $d$.

As soon as the lever H is elevated a spring, N, acts upon the arm M', and through it upon the lever M, and causes it to connect the members $r'$ $u$ of the clutch, and thus impart the movement of the wheel's axle $t$ to the driving-belt $p$.

The movement of the lever H to disconnect the clutch serves to raise the whole number of furrow-openers from the ground through the mechanism before described, and the opposite movement serves to lower them for use. This simultaneous raising of all the openers is necessary in going to or leaving a field; but it must be observed that each separate furrow-opener has an independent individual movement for clearing stones and other obstructions incident to the employment of the flat steel springs B. After an opener has passed an obstruction, its spring immediately acts to bring it back into its furrow, its action in clearing and returning being thus automatic.

The act of raising all the openers from the ground by the lever H serves, also, to stop the feed, and the act of lowering the openers connects a train of mechanism adapted to put the feed-shaft in motion, as will appear from the foregoing, thus simplifying the machine and harmonizing its action.

What we claim is—

1. The furrow-openers A, having the tubular extensions A', the V-shaped ends, and the sharp-edged colters $a$, constructed as shown, in combination with flat straight lifting or operating and supporting springs B, and tongues $b$, substantially as described.

2. The combination of the furrow-openers A, straight flat springs B, hinged bar C, rod E, link F, lever H, and toothed rack J, all constructed and arranged substantially as described.

THOMAS BRENNAN.
JAMES TAYLOR.
JOHN T. LYNAM.

Witnesses:
FRANK PARDON,
E. B. HEWITT.